(12) United States Patent
Cheng et al.

(10) Patent No.: US 12,105,241 B2
(45) Date of Patent: Oct. 1, 2024

(54) CONDITIONING METHOD AND SYSTEM FOR CHANNEL LOBE DEPOSITION ENVIRONMENT

(71) Applicant: ExxonMobil Technology and Engineering Company, Spring, TX (US)

(72) Inventors: Mulin Cheng, Spring, TX (US); Xiao-Hui Wu, Sugar Land, TX (US); Hayes F. Stripling, IV, Spring, TX (US); Pengchuan Zhang, Kirkland, WA (US); Tiangang Cui, Blackburn South (AU); John E. Mayhew, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 681 days.

(21) Appl. No.: 16/353,610

(22) Filed: Mar. 14, 2019

(65) Prior Publication Data

US 2019/0302308 A1 Oct. 3, 2019

Related U.S. Application Data

(60) Provisional application No. 62/651,479, filed on Apr. 2, 2018.

(51) Int. Cl.
*G01V 20/00* (2024.01)
(52) U.S. Cl.
CPC .................................. *G01V 20/00* (2024.01)
(58) Field of Classification Search
CPC .................................................. G01V 99/005
See application file for complete search history.

(56) References Cited

U.S. PATENT DOCUMENTS 5,675,147 A   10/1997  Ekstrom et al.
7,337,069 B2   2/2008  Masson et al.
(Continued)

FOREIGN PATENT DOCUMENTS

WO   WO 2015/168417 A1   11/2015

OTHER PUBLICATIONS

Hobo. N. et al. (2014) "Reconstruction of eroded and deposited sediment volumes of the embanked River Waal, the Netherlands, for the period AD 1631-present", Earth Surface Processes and Landforms, vol. 39, No. 10, Feb. 21, 2014, pp. 1301-1318. XP055672979.

(Continued)

*Primary Examiner* — Shelby A Turner
*Assistant Examiner* — Brandon J Becker
(74) *Attorney, Agent, or Firm* — ExxonMobil Technology and Engineering Company—Law Department

(57) ABSTRACT

Geologic modeling methods and systems are provided with a novel log segmentation approach and an improved conditioning technique for fitting geobody templates to associated well segments in multiple wells. One illustrative geologic modeling method embodiment includes: deriving a sequence of well segments from each logged well in a region of interest; associating well segments from different wells to form sets of associated well segments; populating a region of interest with geobodies by fitting a parameterized geobody template to each set of associated well segments; using the geobodies to specify a volumetric distribution of formation properties throughout the region of interest; and providing the volumetric distribution as a geologic model suitable for evaluating one or more well placement and production strategies.

13 Claims, 5 Drawing Sheets

(56) References Cited

U.S. PATENT DOCUMENTS

| | | | |
|---|---|---|---|
| 7,706,981 B2* | 4/2010 | Wilkinson | G01V 99/00 702/14 |
| 8,892,412 B2 | 11/2014 | Ghayour et al. | |
| 2006/0041410 A1* | 2/2006 | Strebelle | G01V 11/00 703/10 |
| 2009/0265152 A1 | 10/2009 | Cacas et al. | |
| 2009/0319243 A1* | 12/2009 | Suarez-Rivera | G06T 17/05 703/10 |
| 2011/0131015 A1* | 6/2011 | Yarus | G06F 17/00 703/1 |
| 2013/0187648 A1* | 7/2013 | Freed | G01R 33/448 324/303 |
| 2013/0246031 A1 | 9/2013 | Wu et al. | |
| 2013/0317779 A1* | 11/2013 | Thorne | G01V 11/00 702/180 |
| 2014/0214327 A1* | 7/2014 | Ravndal | G01V 20/00 702/14 |
| 2015/0073764 A1 | 3/2015 | Courtade et al. | |
| 2015/0219793 A1* | 8/2015 | Li | G01V 99/005 703/2 |
| 2015/0260872 A1* | 9/2015 | Hou | G01V 11/00 702/7 |
| 2016/0168959 A1* | 6/2016 | Yarus | G06T 17/05 703/2 |
| 2016/0369626 A1* | 12/2016 | Donderici | E21B 44/02 |
| 2016/0370488 A1* | 12/2016 | San Martin | E21B 47/026 |
| 2017/0052283 A1* | 2/2017 | Hoeink | E21B 43/26 |
| 2018/0031719 A1* | 2/2018 | Huang | G06T 17/20 |
| 2018/0188415 A1* | 7/2018 | Imhof | G01V 99/005 |
| 2019/0093468 A1* | 3/2019 | Aguirre | E21B 44/00 |

OTHER PUBLICATIONS

Lemon et al. (2003) "Building solid models from boreholes and user-defined cross-sections", *Computers & Geosciences*, vol. 29, pp. 547-555.

Pyrcz et al. (2009) "ALLUVSIM: A program for event-based stochastic modeling of fluvial depositional systems", *Computers & Geosciences*, vol. 35, pp. 1671-1685.

\* cited by examiner

CONDITIONING METHOD AND SYSTEM FOR CHANNEL LOBE DEPOSITION ENVIRONMENT

CROSS REFERENCE TO RELATED APPLICATION

This application claims the priority and benefit of U.S. Provisional Application Ser. No. 62/651,479, filed Apr. 2, 2018, the disclosure of which is incorporated herein by reference in its entirety.

TECHNICAL FIELD

The present application relates to methods and systems for subsurface structure mapping and modeling. More specifically the present application relates to geologic modeling methods and systems that enable improved fitting of parameterized feature templates to sets of associated well segments from different wells.

BACKGROUND

A geologic model is a computer-based three-dimensional ("3D") representation of a region beneath the earth's surface. Such models can be used to model a petroleum reservoir, a depositional basin, or other regions which may have valuable mineral resources. Once the model is constructed, it can be used for various purposes, many of which are intended to facilitate efficient and economical recovery of the valuable resources. For example, the geologic model may be used as an input to petroleum reservoir simulations, which are used to plan well placements and predict hydrocarbon production from a petroleum reservoir over time.

Geologic models must often be derived from measurements made by technologies that detect the structure and properties of subsurface formations with only limited resolution (e.g., seismic imaging) or very limited coverage (e.g., well logging). Because reservoir fluid movements can be significantly affected by reservoir features insufficiently resolved and/or outside the coverage of well logging instruments, it is often desirable for the geologic model to fill in the missing detail using interpreted or conceived geologic feature descriptions. Examples of such geologic features include channel scour and depositional lobes typical of hydrogeologic processes in deltaic, shallow-water, and deep-water deposition environments.

Because of the ambiguity in the limited measurement data, it is normally possible for the geologic features to be configured in multiple ways that would each be consistent with the measurements. Thus, it is generally considered desirable to find multiple such configurations, thereby enabling the engineers to assess the modeling uncertainty. If only a limited number of configurations are found to be consistent with the data, varying only in ways not significantly impacting the well placement decisions and reservoir productivity, the engineers can proceed with a higher degree of confidence in their chosen geologic model. Conversely, if the measurement data supports a number of wildly-varying configurations, additional data may be acquired before substantial resources are invested. In the middle ground, it may be possible to identify a limited number of solution "classes" able to support a consistent initial approach to developing the reservoir. Additional well logs and production history may then enable the solution classes to be distinguished and/or a selected model to be refined for consistency with the physical structure of the reservoir and to be used for further development of the reservoir.

U.S. Patent Application Publication No. 2013/0246031, entitled "Constructing Geologic Models from Geologic Concepts", which is hereby incorporated herein by reference, sets forth a detailed modeling process that includes, among other things: mapping the measurement data representing the physical reservoir into a continuous (i.e., unfaulted) "design space", fitting surfaces to the measurement data in design space, combining the surfaces to form region boundaries (thereby defining different regions and the interfaces between them), setting formation properties within each region, and mapping the resulting structures from a design space back to the physical space thereby obtaining a geologic model suitable for evaluating various strategies for well-placement and production by simulating the resulting reservoir fluid movements. The surface fitting aspect of the process, which may also be herein referred to as "conditioning", employs explicit or implicit functions to define the surfaces. The disclosed functions include coefficients or other parameters that are varied to alter the position and shape of the surface, ideally in a fashion that reduces mismatch between the surfaces and the measurement data. An important part of the disclosed modeling process is the approach used to identify and correlate interfaces from different wells, as the fitting process relies on appropriate groupings of these interfaces. However, in certain deposition environments (such as the channel lobe deposition environment), the hierarchical identification and fitting approach set forth in U.S. Patent Application No. 2013/0246031 may perform poorly.

Therefore, there is a need for improved methods and systems for mapping and modeling geologic systems, particularly those that include channel scour and depositional lobes typical of deltaic, shallow-water, and deep-water deposition environments. Further, there is a need for improved methods and systems that enable improved fitting of parameterized feature templates to sets of associated well segments from different wells for such geologic systems.

Additional background references may include U.S. Patent Application Publications No. 2009/0265152; U.S. Pat. Nos. 5,675,147, 7,337,069, 7,706,981 and 8,892,412; and PCT Publication No. WO 2015/168417.

SUMMARY

Disclosed herein are geologic modeling methods and systems employing a log segmentation approach coupled with an improved conditioning technique for fitting geobody templates to associated well segments in multiple wells. One or more illustrative embodiments include: deriving a sequence of well segments from each logged well in a region of interest; associating well segments from different wells to form sets of associated well segments; populating a region of interest with geobodies by fitting a parameterized geobody template to each set of associated well segments; using the geobodies to specify a volumetric distribution of formation properties throughout the region of interest; and providing the volumetric distribution as a geologic model suitable for evaluating one or more well placement and production strategies.

One or more embodiments of useful illustrative geologic modeling systems include a memory having geologic modeling software; and one or more processors coupled to the memory to execute the geologic modeling software. When executed, the software causes the one or more processors to perform operations including: deriving a sequence of well segments from each logged well in a region of interest; associating well segments from different wells to form sets of associated well segments; populating a region of interest with geobodies by fitting a parameterized geobody template to each set of associated well segments; using the geobodies to specify a volumetric distribution of formation properties throughout the region of interest; and storing, in an information storage device, the volumetric distribution as a geologic model suitable for evaluating one or more well placement and production strategies.

The software can also be illustratively embodied as a computer readable program in a non-transitory information storage product, to implement the foregoing system and method embodiments when suitably executed.

Each of the foregoing embodiments may be employed individually or conjointly, and may further employ one or more of the following features in any suitable combination. For example, in any of the foregoing embodiments deriving the sequence of well segments from each logged well in a region of interest may include, in a top-to-bottom order for each logged well: iteratively checking for a mud interval, a scour interval, or a lobe interval; wherein if a mud interval is found, extracting a corresponding mud segment and removing the mud interval from further consideration; wherein if a scour interval is found, extracting a scour segment before extracting a lobe or mud segment (dependent upon considerations such as the underlying feature type in the log or other geologic constraints) and removing a corresponding portion of the scour interval from further consideration; and wherein if a lobe interval is found, extracting a lobe segment and removing a corresponding portion of the lobe interval from further consideration. In one or more embodiments, each scour interval may be compared with a maximum scour thickness and, if the maximum scour thickness is exceeded, the extracted scour segment and the extracted lobe or mud segment may be each determined stochastically and accompanied by an additional stochastically-sized lobe or mud segment having a corresponding portion of the extracted scour segment removed from further consideration. In one or more embodiments, each scour interval may be compared with a maximum scour thickness and, if the maximum scour thickness is not exceeded, the extracted scour segment corresponds to the scour interval and the extracted lobe or mud segment may be sized conditionally based on whether or not an underlying interval is a lobe interval. In one or more embodiments, an underlying lobe interval, if present, may be included when determining a size of the extracted lobe segment. For example, each lobe interval may be compared with a maximum lobe thickness and, if the maximum lobe thickness is exceeded, the extracted lobe segment is determined stochastically, and if the maximum is not exceeded, the extracted lobe segment corresponds to the lobe interval.

In one or more embodiments, associating well segments from different wells to form sets of associated well segments may include: defining a lobe set for each lobe segment; combining lobe sets from different wells only if (a) the wells are separated by a distance less than a maximum lateral lobe dimension, (b) the segments in a combined lobe set can be connected by contours that would not cross interpreted surfaces from seismic survey data, and (c) lines connecting the segments in the combined lobe set do not cross lines connecting segments in any existing sets; and systematically iterating through all possible combinations to determine feasible arrangements of lobe sets. In some embodiments, the associating may further include: defining a mud set for each mud segment; combining mud sets from different wells only if: (e) the segments in a combined mud set can be connected by contours that would not cross interpreted surfaces from seismic survey data, and (f) lines connecting the segments in the combined mud set do not cross lines connecting segments in any existing sets. In some embodiments, iterating may include determining feasible arrangements of mud sets.

In one or more embodiments, fitting a parameterized geobody template to each set of associated well segments may include adapting parameter values to reduce a mismatch error between the template and the set of associated well segments, the mismatch error including: (g) for each well segment in the set intersected by the template, a measure of error along a well axis between the template surface and an edge of that well segment, and (h) for each well segment in the set not intersected by the template, a measure of distance between the template surface and a well having that well segment.

In one or more embodiments, the methods and systems may further include storing the volumetric distribution on a non-transitory information storage device; and displaying a visual representation of the volumetric distribution.

As described further herein, the methods and systems may be used in various hydrocarbon operations. For example, the methods and systems herein may provide improved mapping and modeling of geologic systems, particularly for regions of interest hat include channel scour and depositional lobes typical of deltaic, shallow-water, and deep-water deposition environments. Such models of the geologic systems may then be used in various hydrocarbon exploration, development, and production operations.

Figure 1:
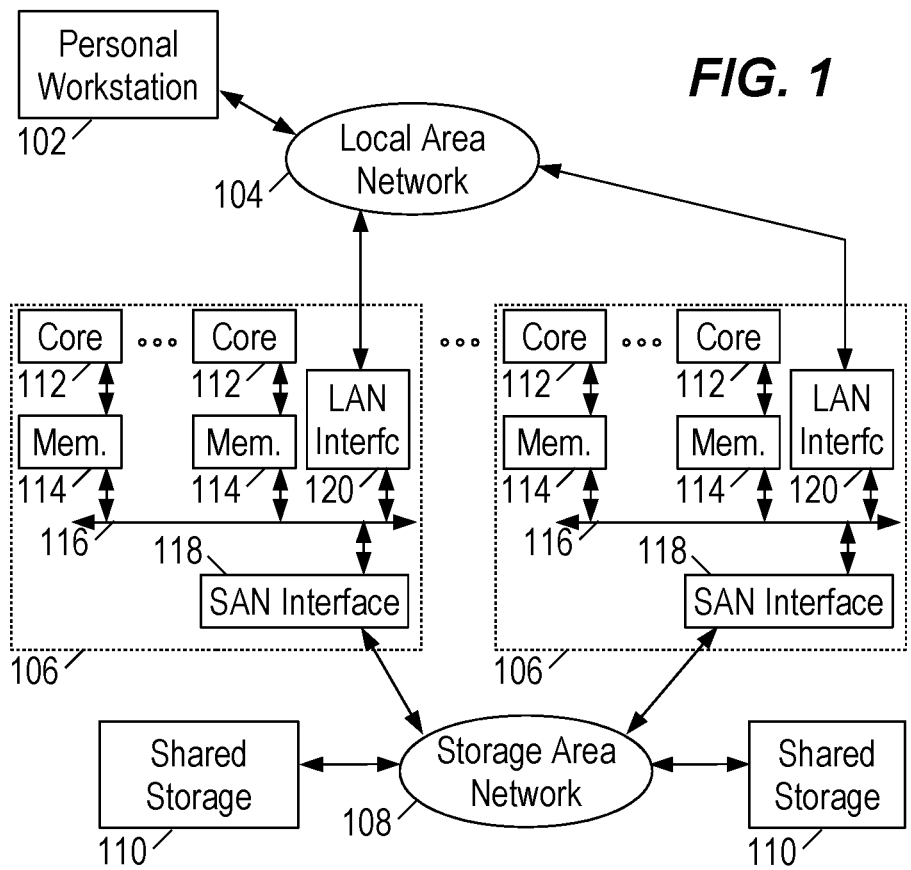
FIG. 1 is block diagram of an illustrative geologic modeling system suitable for modeling channel lobe deposition environments.

It should be understood that the drawings and corresponding detailed description do not limit the disclosure, but on the contrary, they provide the foundation for understanding all modifications, equivalents, and alternatives falling within the scope of the appended claims.

NOMENCLATURE

Various terms as used herein are defined below. To the extent a term used in a claim is not defined below, it should be given the broadest possible definition persons in the pertinent art have given that term as reflected in at least one printed publication or issued patent.

As used herein, the term "basin modeling" refers generally to any method or analysis which provides a representation of the history of a sedimentary basin or other subsurface section of interest and/or an estimate of timing of any component of a hydrocarbon system. For example, a basin model may be used to model, but is not limited to, a burial history, time a specific subsurface location or layer reached a certain temperature or maturity, time for how long a location was in a certain temperature range, timing of expulsion, timing of migration, and/or timing of accumulation. Generally a basin model is based on and/or constrained by measured or derived data representing present day conditions (e.g., stratigraphy, current bottom hole temperature, heat flow) or a condition in the past (e.g., water depth) on which a model of the past history of the area of interest is based.

As used herein, the term "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of data to identify preferred development approaches and methods. Accordingly, hydrocarbon development may include modeling of subsurface formations and extraction planning for periods of production, determining and planning equipment to be utilized and techniques to be utilized in extracting hydrocarbons from the subsurface formation, and the like.

As used herein, the term "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration may include acquiring measurement data, modeling of the measurement data to form subsurface models, and determining likely locations for hydrocarbon reservoirs within the subsurface. The measurement data may include seismic data, gravity data, magnetic data, electromagnetic data, and the like.

As used herein, the term "hydrocarbon operations" refers to any activity associated with hydrocarbon exploration, hydrocarbon development, and/or hydrocarbon production. For example, hydrocarbon operations may comprise hydrocarbon management or managing hydrocarbons, which may include hydrocarbon extraction, hydrocarbon production, hydrocarbon exploration, identifying potential hydrocarbon resources, identifying potential well locations (such as injection and/or production wells), determining well injection and/or extraction rates, identifying reservoir connectivity, acquiring hydrocarbon resources, disposing of and/or abandoning hydrocarbon resources, reviewing prior hydrocarbon management decisions, and any other hydrocarbon related acts or activities.

As used herein, the terms "hydrocarbon production" or "producing hydrocarbons" refer to any activity associated with extracting hydrocarbons from a subsurface location through a well or other opening. Hydrocarbon production normally refers to any activity conducted to form the wellbore along with any activity in or on the well after the well is completed. Accordingly, hydrocarbon production includes not only primary hydrocarbon extraction, but also secondary and tertiary production techniques, such as injection of gas or liquid for increasing drive pressure or mobilizing the hydrocarbons; treating the well by, for example, chemicals or hydraulic fracturing the wellbore to promote increased flow; well servicing; well logging; and other well and wellbore treatments.

As used herein, the term "geologic model" refers to a model, such as a computer-based representation, of a subsurface earth volume, such as a petroleum reservoir or a depositional basin. Geologic models may take on many different forms. Depending on the context, descriptive or static geologic models built for petroleum applications can be in the form of a 2-D or 3-D array of cells, to which geologic and/or geophysical properties such as lithology, porosity, acoustic impedance, permeability, or water saturation are assigned (such properties are referred to collectively herein as "reservoir properties"). Many geologic models are constrained by stratigraphic or structural surfaces (for example, flooding surfaces, sequence interfaces, fluid contacts, and/or faults) and boundaries (for example, facies changes). These surfaces and boundaries define regions within the model that possibly have different reservoir properties.

As used herein, "geomechanical model" is a model (e.g., a two-dimensional model or a three-dimensional model) of the subsurface that contains properties, such as static properties, and may model responses to changes in stress, such as mechanical response. The static properties may include properties, such as rock compressibility and Poisson's ratio, while the mechanical response may include compaction, subsidence, surface heaving, faulting, and seismic event, which may be a response to of the rock to fluid injection and extraction operations.

As used herein, the term "mud" refers to a non-channel scour or lobe segment such as: fine-grained clastic, carbonate, volcanic, or other deposits.

As used herein the term "region of interest" refers to an area or volume of geologic interest, and may be associated with the geometry, attitude, and arrangement of the area. A region of interest may have characteristics such as folding, faulting, cooling, unloading, and/or fracturing that has occurred therein. In the context of a subsurface model, a region of interest may be represented as a contiguous part of the model, such as a contiguous two-dimensional or three-dimensional part of the model. In some embodiments, the region of interest may refer to an interval or compartment within a reservoir where hydrocarbons, non-hydrocarbon gases, and/or water may reside.

As used herein, the term "reservoir model" is a model (e.g., a two-dimensional model or a three-dimensional model) of the subsurface that in addition to static properties, such as porosity and/or permeability, also has dynamic properties that vary over the timescale of resource extraction, such as fluid composition, pressure, and/or relative permeability.

As used herein, the term "subsurface model" refers to a model of a subsurface region and may include a reservoir model, a geomechanical model, a watertight model, and/or a geologic model. The subsurface model may include subsurface data distributed within the model in two-dimensions (e.g., distributed into a plurality of cells, such as elements or blocks), three-dimensions (e.g., distributed into a plurality of voxels), or four or more dimensions. In preferred embodiments, the subsurface models described herein are two-dimensional or three-dimensional models.

DETAILED DESCRIPTION

Various specific embodiments, versions, and examples of the invention will now be described. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The methods and improvements disclosed herein may be embodied as a computer based system, such as the exemplary computer based system shown in FIG. 1. The illustrative geologic modeling system may include a personal workstation 102 coupled via a local area network (LAN) 104 to one or more multi-processor computers 106, which are in turn coupled via a storage area network (SAN) 108 to one or more shared storage units 110. Personal workstation 102 serves as a user interface to the model conditioning system, enabling a user to load data into the system, to configure and monitor the operation of the system, and to retrieve the results (often in the form of image data) from the system. Personal workstation 102 may take the form of a desktop computer with a display that graphically shows representations of the input and result data, and with a keyboard that enables the user to move files and execute processing software. LAN 104 provides high-speed communication between multi-processor computers 106 and with personal workstation 102. The LAN 104 may take the form of an Ethernet network.

Multi-processor computer(s) 106 provide parallel processing capability to enable suitably prompt processing of the input data to derive the results data. Each computer 106 includes multiple processors 112, distributed memory 114, an internal bus 116, a SAN interface 118, and a LAN interface 120. Each processor 112 operates on allocated tasks to solve a portion of the overall problem and contribute to at least a portion of the overall results. Associated with each processor 112 is a distributed memory module 114 that stores application software and a working data set for the processors' use. Internal bus 116 provides inter-processor communication and communication to the SAN or LAN networks via the corresponding interfaces 118, 120. Communication between processors in different computers 106 can be provided by LAN 104.

SAN 108 provides high-speed access to shared storage devices 110. The SAN 108 may take the form of, e.g., a Fibrechannel or Infiniband network. Shared storage units 110 may be large, stand-alone information storage units that employ magnetic disk media for nonvolatile data storage. To improve data access speed and reliability, the shared storage units 110 may be configured as a redundant disk array ("RAID").

The processors 112 cooperatively execute geologic modeling software stored in the distributed memory and/or on the shared storage units, which configures to processors to retrieve measurement data and stored model information from the shared storage units 110, operate on the retrieved data and information to implement the modeling methods and improvements disclosed herein, and to store the resulting geologic models on the shared storage units 110 for future use. Such future use includes visualization methods to convey model information to users, simulation of reservoir fluid movements, and evaluation of well placement and production strategies, enabling users to select sites for drillers to direct boreholes, complete wells, and produce reservoir fluids in an efficient manner.

Figure 2:
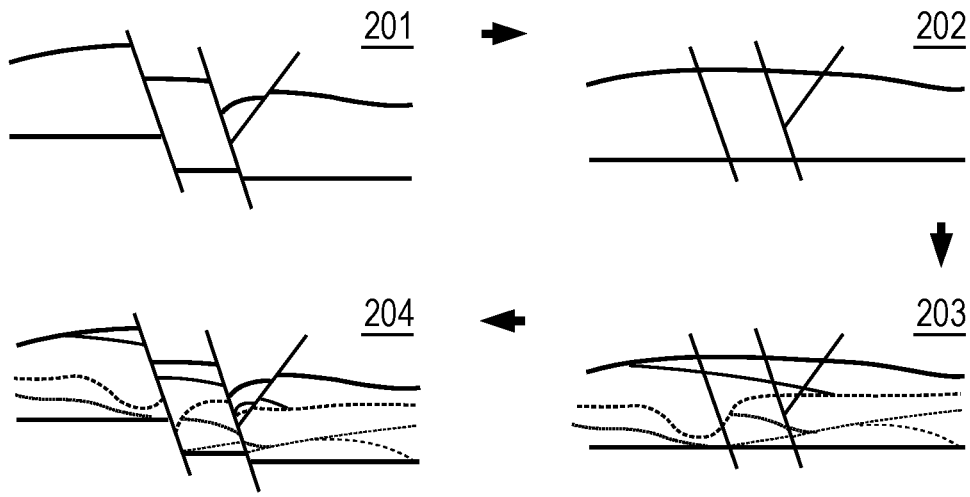
FIG. 2 shows an illustrative sequence of geologic model creation.

FIG. 2 provides an overview of the geologic model creation process, which may begin with obtaining seismic survey data, migrating and/or inverting the traces to detect large-scale subsurface structures, and interpreting the migrated/inverted trace data to clearly define the formation boundaries, as represented by physical measurement model 201. (Though a 2D representation is shown here for easy illustration, in practice the physical model usually has three spatial dimensions.) As seismic trace data can be sensitive to fluid porosity and density, the physical model may associate estimated rock properties with each point in the physical volume being modeled. The log data from any wells located in the modeled volume may further be used to estimate rock properties where the wells are positioned, and may be krigged or otherwise extrapolated to inter-well spaces. As previously mentioned, however, such models may have insufficient resolution to support simulation of reservoir fluid movement and hence to properly evaluate well placement and production strategies.

Before relying on geologic feature templates to "fill in" sufficient detail, it is desirable to map the measurement data model 201 from the physical space, which may have faults or other geological discontinuities, to a continuous design space where such discontinuities have been "erased". FIG. 2 shows the resulting design-space measurement model 202. It is this design space in which geologic features are speculatively introduced and conditioned to match the measurement data, producing a design space geologic model 203 having the finer structural details. If the physical-to-design space mapping is then applied in reverse, a physical-space geologic model 204 is obtained having more finely-detailed formation structure, which yet remains consistent with the measured structural information. Because the filled-in information is based on physical models of geologic processes, the geologic models may tend to be more realistic than statistically-based extrapolations.

Figure 3:
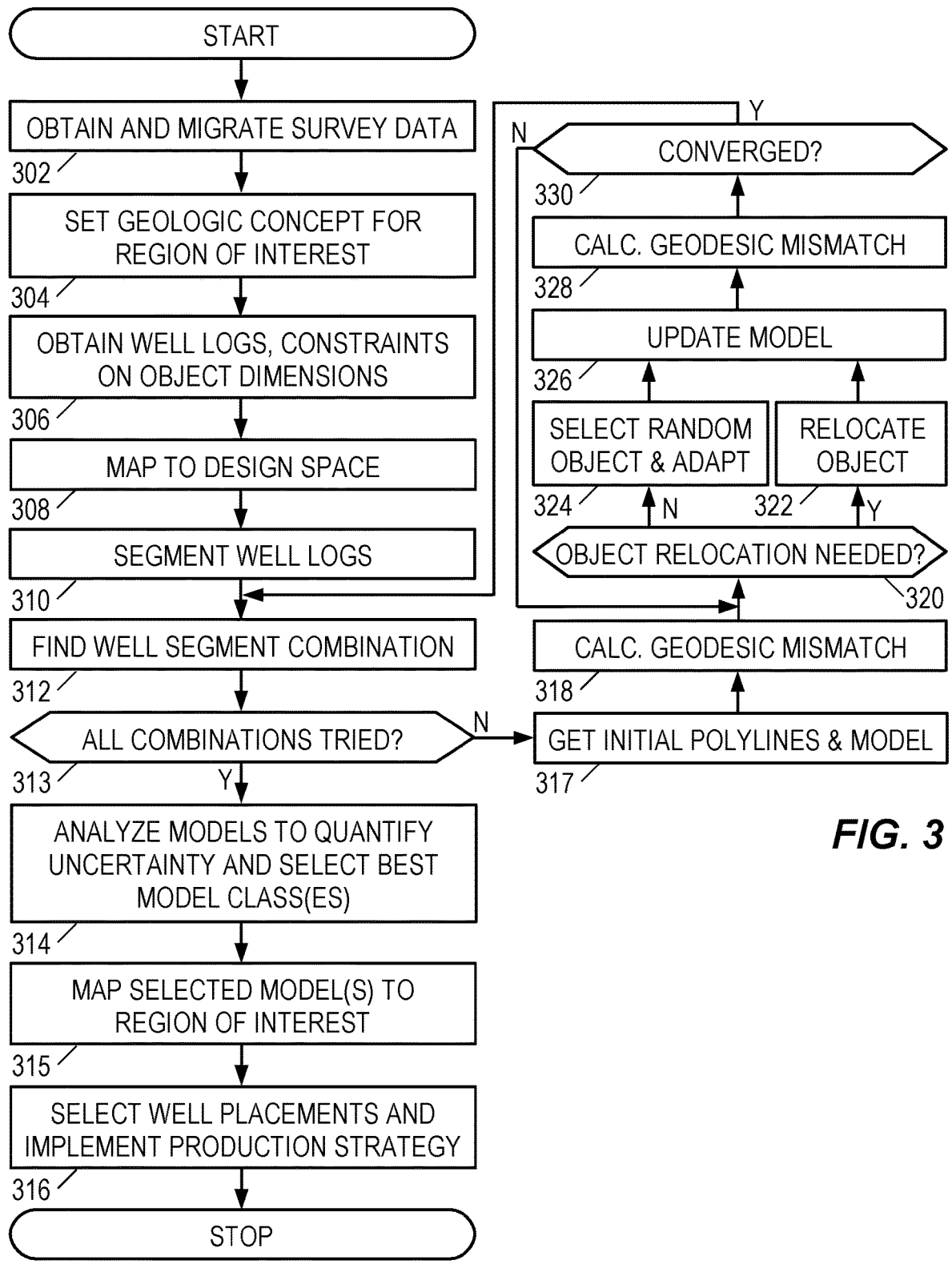
FIG. 3 is a flow diagram of an illustrative geologic modeling method suitable for channel lobe deposition environments.

FIG. 3 is a flow diagram of an illustrative method for creating a geologic model for a channel-lobe deposition environment. It begins in block 302 with obtaining seismic survey data and migrating/inverting the traces to obtain at least a high-level picture of the subsurface structure, usually embodied as a physical measurement model. Though typical and preferred, seismic survey data is not strictly required and may be omitted from the method. In block 304, the physical measurement model is examined to "interpret" the data, i.e., to identify the formation boundaries and structures. While this interpretation can be automated to at least some degree, the current industry practice is to have a geologist or other professional supervise the interpretation process or to perform the interpretation manually. As part of the interpretation process, particular regions of the model may be identified as being of particular interest and may be associated with a geologic concept such as a channel lobe deposition environment. Such environments may have a higher-than-average concentration of hydrocarbon resources.

In block 306, the system obtains well logs for the region of interest, and may further obtain or receive constraints on feature (depositional lobes, channel scour, and mud layer) dimensions and boundary positions. Such constraints may be set based on structure derived from seismic surveys, estimated sedimentation transport rates, empirical models, and/or experience. In block 308, the identified regions and well logs are mapped to design space. Techniques for performing this mapping are described in the open literature and may be found in, e.g., U.S. Patent Application Publication No. 2013/0246031 "Constructing Geologic Models from Geologic Concepts".

In block 310, the interpreted environment of deposition (EOD) regions of the design-space well logs are obtained by the system. The interpretation is normally performed manually, but can alternatively be performed in an automated manner based on the rock properties derived from well logs. The rock properties (primarily grain size) enable each region to be associated with an environment of deposition such as, e.g., fine-grained suspension deposit layer ("mud"), medium-grained depositional lobe ("lobe"), channel system (coarse-grained "scour"), carbonate structure, etc. Also in block 310, the system applies a segmentation process to the interpreted regions (as discussed further below) to obtain boundaries for individual geobodies (i.e., the geologic features being introduced to fill in detail).

In block 312, the system establishes associations between compatible segments from different wells which could be part of shared geologic features. This operation is discussed in further detail below, but we note here that multiple different associations are generally feasible, and each acceptable collection of associations for the region of interest is herein termed a "combination" of sets of associated well segments. Block 312 is part of a loop that may be repeated to systematically iterate through the possible associations to identify each possible combination that is consistent with acquired data, the applied geologic concept, and known geologic principles.

In essence, block 312 defines a "scenario" for the zone of interest. The outer loop consists of blocks 312-313, 317-330, and it is performed for each scenario identified in block 312. A test is performed in block 313 to determine if all scenarios (i.e., identified combinations of associated well segment sets) have been conditioned, and if so, the loop terminates.

In block 314, the mismatch information of the various scenario-based models provided by the loop are analyzed to ascertain the uncertainty of the solution and identify which solution or classes of solution are most likely to correspond to the actual reservoir structure.

In block 315, the system takes each selected model and employs the geobody boundaries specified therein to map out volumetric formation properties within the design space. Within each geobody, the assigned volumetric properties vary smoothly and the geobody boundaries mark abrupt transitions in property values, in accordance with geologic principles. The system then maps the volumetric formation properties from the design space back to the region of interest in physical space, reversing the mapping function of block 308. The physical space model is stored on an information storage device for future use. In block 316, the stored physical space models may be used to evaluate various well placement and reservoir production strategies, typically via simulation. The optimal placement and production strategy is then implemented in the field.

Otherwise, in block 317 (i.e., if the loop hasn't terminated), the system generates an initial model, which in at least some embodiments, includes selecting random parameter values for a pre-set number of geobodies. The parameters may include a choice of "polyline", which is a sequence of edges in a polygonal 3D mesh representation of the design space, to serve as a centerline for each geobody template. As the loop is repeated, subsequent initial models may be based on the optimized model from the previous iteration, or random "perturbations" of the previous model.

In block 318, the system associates each modeled geobody with a corresponding set of associated well segments and calculates a mismatch between the parameterized geobody template and the corresponding set of associated well segments. Preferably, the mismatch calculation includes, for each associated well segment intersected by the template, a mismatch error between the template's surface and an edge of the well segment along the well axis. Preferably, the mismatch calculation further includes, for each associated well segment not intersected by the template, a geodesic distance (or suitable surrogate for measuring the distance) between the well and the associated geobody, so that the mismatch calculation is not limited to error as measured along the wellbore axis. Including the geodesic distance between the well and the associated geobody, aggregated across the multiple wells penetrating the geobody, is expected to provide greater sensitivity to parameter variation and thus accelerate the optimization process. In addition to the geodesic distance calculation, the mismatch calculation may further include other penalty calculations to promote desired aspects of the solution, e.g., a preferred orientation, enforced alignment with (or prohibited crossings of) interpreted horizons, and constraints on geobody dimensions or distortion.

As the initial model may employ randomly-placed (or semi-randomly placed) geobodies, the initial mismatch calculation is expected to be non-zero for most if not all of the geobodies. In block 320, the system identifies the geobody having the largest geodesic distance or mismatch calculation and determines whether it exceeds a threshold. If so, the system in block 322 modifies the geobody location and/or selects a different corresponding set of associated well segments for the calculation. Otherwise, in block 324 the system randomly selects one of the geobodies and calculates an error gradient corresponding to the associated template parameters, which is used to adapt the parameter values so as to reduce the mismatch calculation. Any of a wide variety of known adaptation techniques (e.g., gradient descent, LMS algorithm, Gauss-Newton) may be used for the parameter adjustments. In block 326, the boundary position of the relocated/adapted geobody is determined (at least at the well locations). The geodesic mismatch calculation is then updated in block 328.

In block 330, the system determines whether the largest mismatch, or alternatively, the total mismatch, is below a second threshold, or whether a maximum number of loop iterations has been reached. If convergence has not been achieved, blocks 320-330 are repeated. Once convergence is achieved, the system returns to block 312 to find the next scenario.

Figure 4:
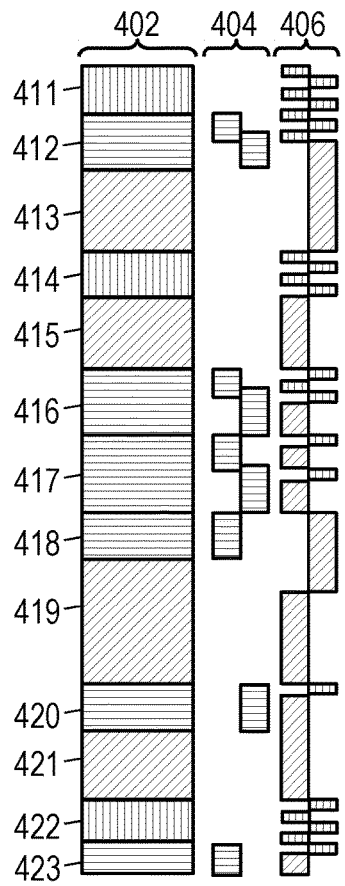
FIG. 4 is an illustrative segmentation of a well log having only approximately ordered erosional and depositional segments.

FIG. 4 shows an example of an interpreted EOD well log 402, having regions numbered 411 through 423. The regions having vertical cross-hatching (i.e., regions 411, 414, and 422) are interpreted as mud layers. The regions having diagonal cross-hatching (i.e., regions 413, 415, 419, and 421) are interpreted as deposition lobes. The regions having horizontal cross-hatching (i.e., regions 412, 416, 417, 418, 420, and 423) are interpreted as scour erosion/deposition. While the thinner regions could realistically be associated with a single geobody, the thicker regions more likely represent an aggregation of multiple geobodies. Accordingly, the segmentation process may subdivide the interpreted regions into smaller segments. A stochastic subdivision process may be preferred, subject to constraints derived from seismic survey data (i.e., interpreted horizons), which effectively divide the log into discrete subzones. Additionally, these may be further constrained using well log analytics and filtering to better define object boundaries and hierarchy.

In FIG. 4, column 404 shows the segments representing erosional geobodies (i.e., scour), while column 406 shows the segments representing depositional geobodies. (The horizontal offset within each column is provided solely for legibility.) While the chronological order of deposition is generally from bottom to top, erosional processes may remove or modify what has been previously deposited. In the segmentation of FIG. 4, the depositional segments eroded by scour segments are filled in stochastically. The log 402 can be recovered by applying the scour segments 404 to the sequence of deposition segments 406.

Figure 5A:
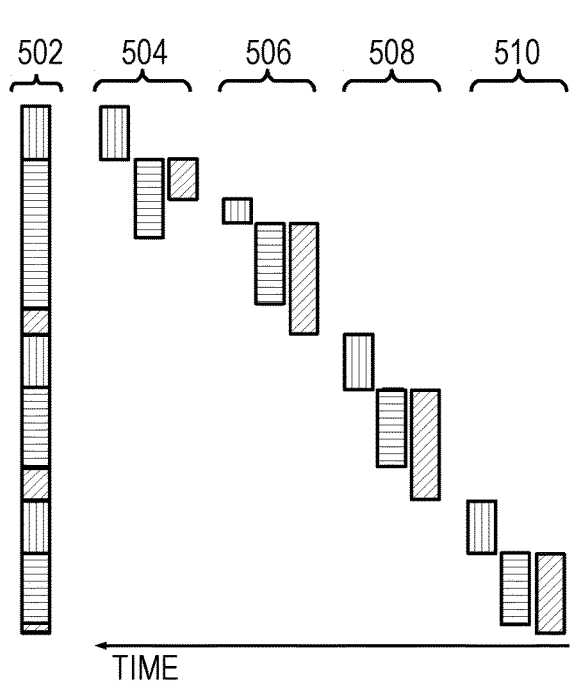
FIG. 5A is an illustrative segmentation of a well log having an ordered segment sequence.

An automated segmentation process accounts for the observation that depositional processes only build upward, and thus do not modify previous depositions, while later erosional processes can remove or modify previous depositions and erosions. In other words, time and erosion are two main factors to be handled in the automated well segmentation. FIG. 5A illustrates the results of one preferred implementation, in which the process is applied to the log 502 from the top down to generate a sequence of depositional lobe, erosional scour (with subsequent fill-in), and mud deposition processes that are consistent with the well log. At each stage (504, 506, 508, 510), three segments are identified, in reverse-time order: non-lobe, scour, and lobe.

Figure 5B:
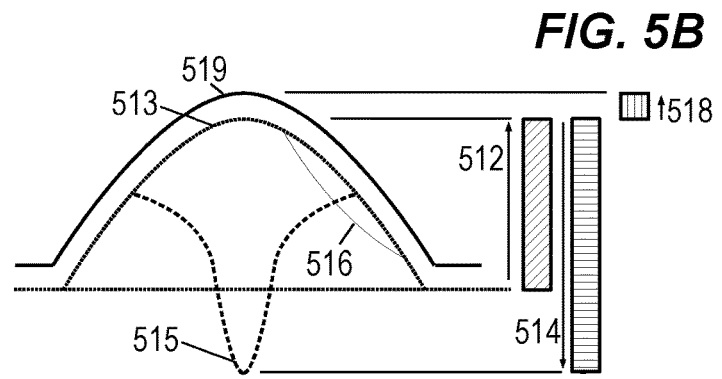
FIG. 5B is a graph of illustrating function-defined surfaces that may be associated with well segments.

To provide some context, FIG. 5B shows illustrative function-defined surfaces that may be later fit to such segments. (FIG. 5B shows a single-well example of a lobe, scour, non-lobe deposition sequence which lies atop previous depositional layers not shown here. Multi-well fitting is discussed further below.) In FIG. 5B, a lobe segment 512 is being fitted with a lobe-shape 513 having a matching peak height. A subsequent scour segment 514 is fit with a channel shape 515, which has been "filled in" to restore the original height, though of course other fill heights are possible. Note that the channel need not be centered, and an alternative off-center channel shape 516 is also shown here, albeit without a matching scour segment. Finally, a mud segment 518 is fit with an overlying mud layer shape 519 having a substantially uniform thickness. In this fashion, each stage in FIG. 5A may be matched with geologic feature shapes to fill in inter-well details of the formation.

Figure 6:
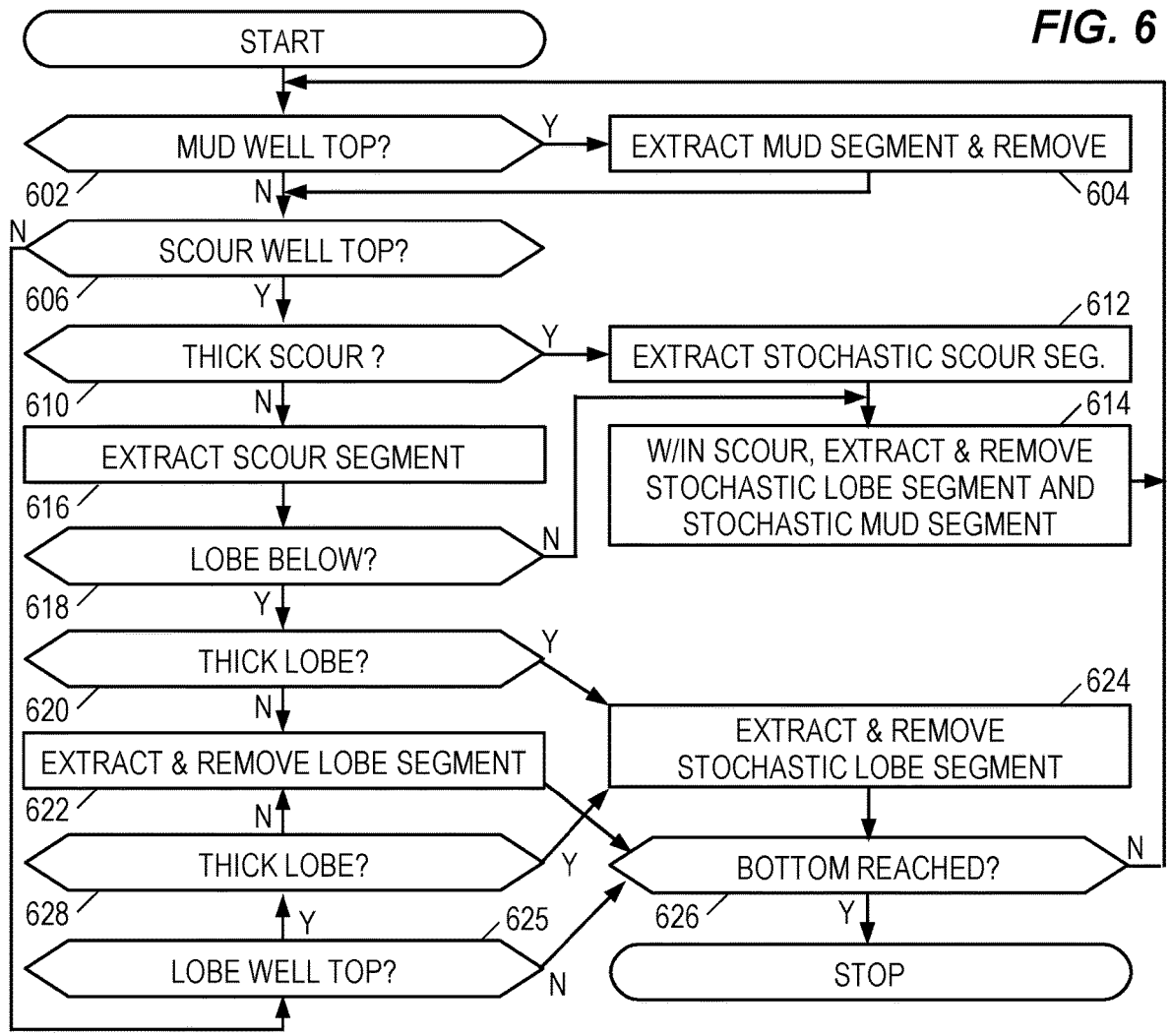
FIG. 6 is a flow diagram of an illustrative well segmentation method.

FIG. 6 is a flow diagram of an illustrative method for achieving the segmentation of FIG. 5A. Given a maximum thickness of the lobe and scour segments, the approach of FIG. 6 extracts the segment sequence in reverse time order, starting from the top of the well log. The system begins in block 602, evaluating the top of the well log to determine whether the first EOD interval is a mud layer. If so, then in block 604 the system defines ("extracts") a mud segment having the height of the mud layer interval, and removes the mud layer interval from the well log, thereby resetting the "top" of the well log.

Otherwise, in block 606, the system determines whether the current top of the well log is a scour interval. If not, then in block 625, the system determines whether the current top is a lobe interval. If scour, the system compares the height of the scour interval with the maximum scour thickness to determine whether the scour interval is too large to be treated as a single scour segment. If so, a smaller scour segment height is generated stochastically in block 612. (The scour segment is not "removed" from the well log, as the resetting of the well log top occurs only when mud or lobe segments are extracted.) In block 614, a stochastic lobe segment and/or a stochastic mud segment are assumed, added to the depositional sequence, and the subsequent thickness is removed from the well log. The heights of these segments together do not exceed the height of the extracted scour segment. From block 614, the system loops back to block 602.

If, in block 610, the system determines that the scour interval height is less than the maximum scour thickness, then in block 616 the system extracts a scour segment equal to the height of the scour interval. In block 618, the system determines whether a lobe interval is present immediately below the scour interval. If not, then the system proceeds to block 614, where stochastic lobe and mud segments are extracted and removed from the well log. If so, the system adds the height from the current top of the well log to the bottom of the underlying lobe interval to determine a potential lobe segment thickness in block 620. If this thickness is less than or equal to the maximum lobe segment thickness, then in block 622 the system extracts a lobe segment having this thickness and removes it from the well log, thereby resetting the top of the well log at the bottom of the underlying lobe interval. If the thickness exceeds the maximum, then in block 624, the system extracts a lobe segment stochastically, removing that segment from the well log.

In at least some embodiments, the user has an option to specify segmentation of (i.e., to specify interfaces within) any given interval. This enables users to input well interpretations that they believe to be valid and which should be preserved by the process. This also enables a user to segment an interval of the log that is less than the maximum (e.g., a 5 m lobe interval could be divided into 2 lobe segments even if the maximum thickness were 12 m).

After the lobe segment is extracted in either block 622 or 624, the system checks in block 626 to see if the bottom of the well log has been reached. If so, the process terminates. Otherwise, the system loops back to block 602.

Returning to block 625, the system determines whether the current top is a lobe interval. If not, the system flows to block 626. Otherwise, the system checks in block 628 whether the lobe thickness exceeds the maximum lobe thickness, and if not, proceeds to block 622. Otherwise the system proceeds to block 624. Because some of the segment thicknesses are generated stochastically, there can be multiple possible segmentations of the well log.

Figure 7A:
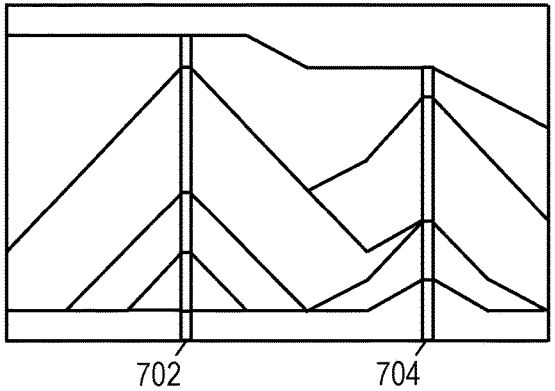
FIGS. 7A and 7B are illustrative interface correlations to associate well segments from different wells.
Figure 7B:
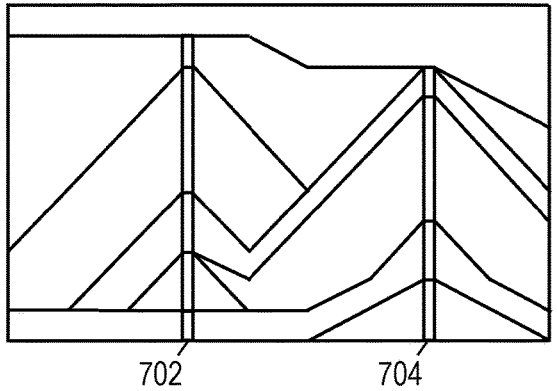

The process of FIG. 6 may be applied to each well in the region of interest, thereby obtaining a sequence of segments for each well. The system then determines, based on the ordering of the segments and typical feature dimensions as compared with the inter-well distances, which segments might be associated with segments from other wells. FIG. 7A shows one example in which the segments from two wells 702, 704, correspond in only their topmost and bottommost segments. However, multiple correlations can exist, and FIG. 7B shows an alternative correspondence in which the topmost segment of well 704 corresponds with a middle segment from well 702, and the bottommost segment of well 702 corresponds to one of the middle segments of well 704.

In some embodiments, the method of associating well segments from multiple wells operates in turn on the lobe segments and the mud segments, and may further be applied to the scour segments. Initially, an individual (single-entity) set ("lobe set") is defined for each lobe segment. The lobe sets are then iteratively evaluated for possible unions to form larger lobe sets. The evaluation may include geologic constraints such as, determining whether the well segments are separated by more or less than a threshold (e.g., a maximum lateral dimension), whether lines or contours between the well segments in the enlarged set would necessarily cross interpreted surfaces or other structures derived from seismic survey data, and whether such lines or contours would necessarily cross the lines or contours of other lobe sets. So long as the union of the sets being evaluated does not violate any such restrictions, the sets may be combined. The process is repeated for the mud segments, and potentially for the scour segments.

As multiple such arrangements are generally possible, the system may iterate through each combination or a subset. Alternatively, such combinations may be generated stochastically for use in the subsequent fitting and model generation process. In each case, the sets of associated well segments are used to define individual geobodies/depositional features. The initial template chosen for each feature may be filtered based on the seismic interpretations, geologic concept models, EOD, and/or structures derived from applicable seismic data to generate an object having an acceptable geometry. The possible combinations of associations between segments presents a combinatorial problem for the fitting process, but the fitting of a feature to a given set of associated segments is a straightforward optimization process.

Figure 8:
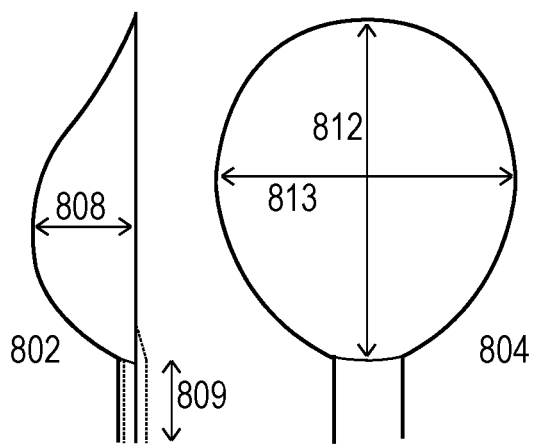
FIG. 8 is an illustrative lobe shape that may be parameterized for conditioning.
Figure 8:
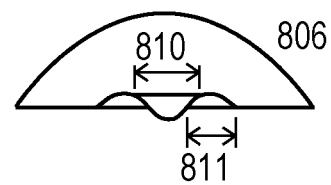

The system operates to fit a geological feature to each given set of associated segments from multiple wells, the isolated segments in individual wells, and to inter-well structures that do not intersect any wells but serve as guides for filling in the inter-well spaces. FIG. 8 shows an illustrative lobe feature template that may be employed by the system. FIG. 8 shows a side profile 802, a plan profile 804, and an end profile 806. In the profiles, various parameters are shown including the lobe height 808, channel length 809, channel width 810, channel lobe width 811, lobe length 812, and lobe width 813. The lateral orientation, position, and curvature of the lobe feature may be specified in the form of a polyline that functions as a centerline of the feature. The polyline may also be adapted by the system.

Figure 9A:
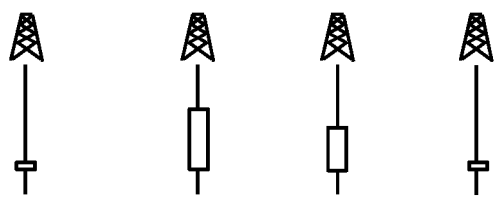
FIGS. 9A, 9B, and 9C show an illustrative conditioning sequence.
Figure 9B:
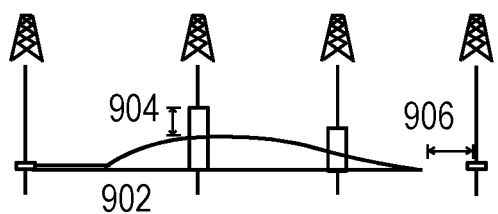
Figure 9C:
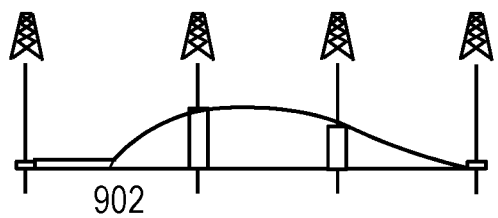

FIG. 9A shows a set of four wells having an associated set of well segments for a lobe feature. In FIG. 9B, an initial lobe 902 is provided, having a well mismatch 904 in each well it intersects and optionally a geodesic distance mismatch 906 with each associated segment that it fails to intersect. If present, geodesic mismatches are combined with well segment mismatch into a combined error measurement, which the optimization system works to minimize through adaptation of the parameters.

The combined error measurement may further include additional sources of mismatch information such as facies, structure derived from seismic surveys, and interpreted surfaces. In some cases, certain boundaries of the introduced features may be clipped to the interpreted surfaces, geobodies, or predefined subzone surfaces. Finally, a numeric optimization method may be employed to adapt the parameter values and minimize the combined error measurement.

The minimum combined error measurement for each set of associated well segments may be obtained for comparison, and the arrangement yielding the smallest minimum combined error measurement may be chosen as the preferred set of associated segments, and the fitted geologic feature may be chosen as the preferred feature. Further adjustments can be made to the geological object by employing spatial transform techniques that manipulate model object geometries to comply with spatial constraints not otherwise captured during the optimization process. For example, object control points may be introduced and moved to distort a geobody shape to increase curvature and/or tortuosity to allow for greater geologic complexity not captured in the parameterized lobe template.

Once each set of associated well segments (including isolated single-well segments) has a fitted lobe, mud layer, or scour channel, the system may generate a list of additional lobe bodies having zero thickness at the wells, arranging them so as to fill the inter-well zone with a realistic distribution that matches the gross thickness and net-to-gross ratio (NTG) data derived from seismic. These lobe bodies may be similarly parameterized and optimized to fit the seismic-derived structure. Because such inter-well information is also employed, the conditioning process may also incorporate the available gross thickness information throughout the region of interest. The disclosed methods and systems thus enable the automatic conditioning of channel-lobe concept models, such as deltaic, shallow water and deep water, to several types of observed or derived data, including well log, well correlation, seismic observations, gross net thickness, and geobodies extracted from inverted seismic volumes.

Though the operations shown and described in the flow diagrams are treated as being sequential for explanatory purposes, in practice the method may be carried out by multiple processors operating concurrently and perhaps even speculatively to enable out-of-order operations. The sequential discussion is not meant to be limiting. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A geologic modeling method that comprises:
obtaining well logs for logged wells in a region of interest, wherein the region of interest comprises a channel-lobe deposition environment;
deriving a sequence of well segments from the well log for each logged well in the region of interest, wherein said deriving includes, in a top-to-bottom order for each well log, iteratively checking for a mud interval and a scour interval and a lobe interval by:
identifying a mud interval;
extracting a corresponding mud segment and removing the mud interval from further consideration, thereby resetting a top of the well log;
identifying a scour interval;
extracting a corresponding scour segment;
identifying a lobe interval; and
extracting a corresponding lobe segment and removing a corresponding portion of the lobe interval from further consideration;
and wherein iteratively checking in the top-to-bottom order comprises proceeding in a reverse-time order, starting from a top of the well log;
associating well segments from different logged wells to form sets of associated well segments, wherein each set of associated well segments corresponds to well segments from different logged wells that include shared geologic features, and wherein said associating includes:
defining a lobe set for each lobe segment;
for at least one pair of the logged wells, determining that:
the well segments for the logged wells are separated by a distance less than a maximum lateral lobe dimension, the well segments in a combined lobe set can be
connected by contours that would not cross interpreted surfaces from seismic survey data, and
lines connecting the well segments in the combined lobe set do not cross lines connecting well segments in any existing lobe sets;
combining lobe sets from the at least one pair of the logged wells; and
systematically iterating through multiple combinations to determine feasible arrangements of lobe sets;
populating the region of interest with geobodies by fitting a parameterized geobody template to each set of associated well segments, wherein assigned volumetric properties of the parameterized geobody template vary smoothly and geobody boundaries of the parameterized geobody template mark abrupt transitions in property values, wherein said fitting includes adapting parameter values to reduce a mismatch error between the parameterized geobody template and the set of associated well segments, wherein the parameter values comprise a choice of polyline to serve as a centerline for the parameterized geobody template, wherein the polyline comprises a sequence of edges in a polygonal three-dimensional mesh, and wherein the mismatch error comprises:
for each well segment in the set intersected by the parameterized geobody template, a measure of error along a well axis between a surface of the parameterized geobody template and an edge of that well segment, and
for each well segment in the set not intersected by the parameterized geobody template, a measure of geodesic distance between the surface of the parameterized geobody template and a well having that well segment;
using the geobodies to specify a volumetric distribution of formation properties throughout the region of interest;
providing the volumetric distribution as a geologic model suitable for evaluating potential well placement and production strategies; and
selecting a desired well placement and production strategy from the potential well placement and production strategies, wherein the desired well placement and production strategy is to be implemented in the region of interest.

2. The method of claim 1, wherein the scour interval is compared with a maximum scour thickness and, if the maximum scour thickness is exceeded, the extracted scour segment and the extracted lobe segment are each determined stochastically and optionally accompanied by a stochastically-sized mud segment having a corresponding portion of the extracted scour segment removed from further consideration.

3. The method of claim 1, wherein the scour interval is compared with a maximum scour thickness and, if the maximum scour thickness is not exceeded, the extracted scour segment corresponds to the scour interval and the extracted lobe segment is sized conditionally based on whether or not an underlying interval is a lobe interval, wherein if present an underlying lobe interval is included when determining a size of the extracted lobe segment.

4. The method of claim 1, wherein the lobe interval is compared with a maximum lobe thickness and, if the maximum lobe thickness is exceeded, the extracted lobe segment is determined either stochastically or via well log analytics; if the maximum is not exceeded, the extracted lobe segment corresponds to the lobe interval.

5. The method of claim 1, wherein said associating further includes:
defining a mud set for each mud segment;
combining mud sets from different wells only if:
the well segments in a combined mud set can be connected by contours that would not cross interpreted surfaces from seismic survey data, and
lines connecting the well segments in the combined mud set do not cross lines connecting well segments in any existing mud sets,
wherein said iterating includes determining feasible arrangements of mud sets.

6. The method of claim 1, further comprising:
storing the volumetric distribution on a non-transitory information storage device; and
displaying a visual representation of the volumetric distribution.

7. A geologic modeling system that comprises:
a memory having geologic modeling software; and
one or more processors coupled to the memory to execute the geologic modeling software, the software causing the one or more processors to perform operations including:
obtaining well logs for logged wells in a region of interest, wherein the region of interest comprises a channel-lobe deposition environment;
deriving a sequence of well segments from the well log for each logged well in the region of interest, wherein said deriving includes, in a top-to-bottom order for each well log, iteratively checking for a mud interval and a scour interval and a lobe interval by:
identifying a mud interval;
extracting a corresponding mud segment and removing the mud interval from further consideration, thereby resetting a top of the well log;
identifying a scour interval;
extracting a corresponding scour segment;
identifying a lobe interval; and
extracting a corresponding lobe segment and removing a corresponding portion of the lobe interval from further consideration;
and wherein iteratively checking in the top-to-bottom order comprises proceeding in a reverse-time order, starting from a top of the well log;
associating well segments from different logged wells to form sets of associated well segments, wherein each set of associated well segments corresponds to well segments from different logged wells that include shared geologic features, and wherein said associating includes:
defining a lobe set for each lobe segment;
for at least one pair of the logged wells, determining that:
the well segments for the logged wells are separated by a distance less than a maximum lateral lobe dimension,
the well segments in a combined lobe set can be connected by contours that would not cross interpreted surfaces from seismic survey data, and
lines connecting the well segments in the combined lobe set do not cross lines connecting well segments in any existing lobe sets;
combining lobe sets from the at least one pair of the logged wells; and systematically iterating through multiple combinations to determine feasible arrangements of lobe sets;

populating the region of interest with geobodies by fitting a parameterized geobody template to each set of associated well segments, wherein assigned volumetric properties of the parameterized geobody template vary smoothly and geobody boundaries of the parameterized geobody template mark abrupt transitions in property values, wherein said fitting includes adapting parameter values to reduce a mismatch error between the parameterized geobody template and the set of associated well segments, wherein the parameter values comprise a choice of polyline to serve as a centerline for the parameterized geobody template, wherein the polyline comprises a sequence of edges in a polygonal three-dimensional mesh, and wherein the mismatch error comprises:

for each well segment in the set intersected by the parameterized geobody template, a measure of error along a well axis between a surface of the parameterized geobody template and an edge of that well segment, and for each well segment in the set not intersected by the parameterized geobody template, a measure of geodesic distance between the surface of the parameterized geobody template and a well having that well segment;

using the geobodies to specify a volumetric distribution of formation properties throughout the region of interest; and storing, in an information storage device, the volumetric distribution as a geologic model suitable for evaluating potential well placement and production strategies; and selecting a desired well placement and production strategy from the potential well placement and production strategies, wherein the desired well placement and production strategy is to be implemented in the region of interest.

8. The system of claim 7, wherein the scour interval is compared with a maximum scour thickness and, if the maximum scour thickness is exceeded, the extracted scour segment and the extracted lobe segment are each determined stochastically and optionally accompanied by a stochastically-sized mud segment having a corresponding portion of the extracted scour segment removed from further consideration.

9. The system of claim 7, wherein the scour interval is compared with a maximum scour thickness and, if the maximum scour thickness is not exceeded, the extracted scour segment corresponds to the scour interval and the extracted lobe segment is sized conditionally based on whether or not an underlying interval is a lobe interval, wherein if present an underlying lobe interval is included when determining a size of the extracted lobe segment.

10. The system of claim 7, wherein the lobe interval is compared with a maximum lobe thickness and, if the maximum lobe thickness is exceeded, the extracted lobe segment is determined stochastically or via well log analytics; if the maximum is not exceeded, the extracted lobe segment corresponds to the lobe interval.

11. The system of claim 7, wherein said associating further includes:

defining a mud set for each mud segment; combining mud sets from different wells only if:

the well segments in a combined mud set can be connected by contours that would not cross interpreted surfaces from seismic survey data, and lines connecting the well segments in the combined mud set do not cross lines connecting well segments in any existing mud sets, wherein said iterating includes determining feasible arrangements of mud sets.

12. The system of claim 7, further comprising:

storing the volumetric distribution on a non-transient information storage device; and displaying a visual representation of the volumetric distribution.

13. A non-transitory information storage product having computer readable program code embodied therein, which when executed implements a geological modeling method that comprises:

obtaining well logs for logged wells in a region of interest, wherein the region of interest comprises a channel-lobe deposition environment;

deriving a sequence of well segments from the well log for each logged well in the region of interest, wherein said deriving includes, in a top-to-bottom order for each well log, iteratively checking for a mud interval and a scour interval and a lobe interval by:

identifying a mud interval;

extracting a corresponding mud segment and removing the mud interval from further consideration, thereby resetting a top of the well log;

identifying a scour interval;

extracting a corresponding scour segment;

identifying a lobe interval; and extracting a corresponding lobe segment and removing a corresponding portion of the lobe interval from further consideration;

and wherein iteratively checking in the top-to-bottom order comprises proceeding in a reverse-time order, starting from a top of the well log;

associating well segments from different logged wells to form sets of associated well segments, wherein each set of associated well segments corresponds to well segments from different logged wells that include shared geologic features, and wherein said associating includes:

defining a lobe set for each lobe segment;

for at least one pair of the logged wells, determining that:

the well segments for the logged wells are separated by a distance less than a maximum lateral lobe dimension, the well segments in a combined lobe set can be connected by contours that would not cross interpreted surfaces from seismic survey data, and lines connecting the well segments in the combined lobe set do not cross lines connecting well segments in any existing lobe sets;

combining lobe sets from the at least one pair of the logged wells; and systematically iterating through multiple combinations to determine feasible arrangements of lobe sets;

populating the region of interest with geobodies by fitting a parameterized geobody template to each set of associated well segments, wherein assigned volumetric properties of the parameterized geobody template vary smoothly and geobody boundaries of the parameterized geobody template mark abrupt transitions in property values, wherein said fitting includes adapting parameter values to reduce a mismatch error between the parameterized geobody template and the set of associated well segments, wherein the parameter values comprise a choice of polyline to serve as a centerline for the parameterized geobody template, wherein the polyline comprises a sequence of edges in a polygonal three-dimensional mesh, and wherein the mismatch error comprises:
- for each well segment in the set intersected by the parameterized geobody template, a measure of error along a well axis between a surface of the parameterized geobody template and an edge of that well segment, and
- for each well segment in the set not intersected by the parameterized geobody template, a measure of geodesic distance between the surface of the parameterized geobody template and a well having that well segment;

using the geobodies to specify a volumetric distribution of formation properties throughout the region of interest; and providing the volumetric distribution as a geologic model suitable for evaluating potential well placement and production strategies; and selecting a desired well placement and production strategy from the potential well placement and production strategies, wherein the desired well placement and production strategy is to be implemented in the region of interest.

* * * * *